United States Patent Office 3,336,330
Patented Aug. 15, 1967

3,336,330
CERTAIN DIBENZOXAZOLYLNAPHTHALENE
COMPOUNDS
Erich Schinzel and Hans Frischkorn, Frankfurt am Main, and Horst Behrenbruch, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 26, 1965, Ser. No. 451,040
Claims priority, application Germany, Apr. 29, 1964, F 42,743; Dec. 28, 1964, F 44,817
2 Claims. (Cl. 260—307)

It is known to use derivatives of benzoxazole as optical brighteners. Thus, it has been proposed in literature to use α,β-di-benzoxazolyl-(2)-ethylenes for the optical brightening of synthetic fibers, in particular of fibers made of cellulose acetate, polyacrylonitrile and polyesters such as polyethylene glycol terephthalate or polyvinyl chloride.

Now, we have found that yellow benzoxazole compounds which show in solution a reddish to greenish-blue fluorescence and which correspond to the general formula (I) 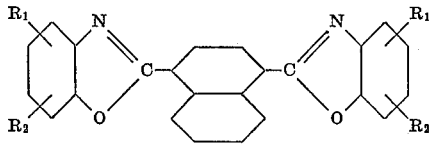

can be used with special advantage as optical brighteners. In the above Formula I the groups $R_1$ and $R_2$, which may be identical or different, represent hydrogen, an alkyl group, a phenyl group, a halogen atom, or together may be a bivalent low molecular alkylene radical fixed by condensation to an isocyclic ring. As bivalent alkylene radicals, there may be used those having 2–5, in particular 4, carbon atoms. In the case of compounds of the Formula I containing open chain alkyl radicals, there may be used as the latter radicals, in particular low molecular alkyl radicals, preferably those containing 1 to 4 carbon atoms, inclusively.

The benzoxazoles of the general Formula I used according to the invention as optical brighteners can be prepared by various methods, for example, by reacting naphthalene-1,4-dicarboxylic acid dichloride with o-amino-phenols of the formula (II) 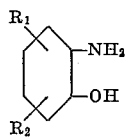

to yield naphthalene-1,4-dicarboxylic acid diamides of the formula (III) 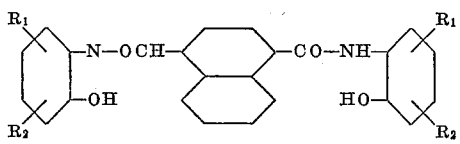

and causing ring closure of the latter compounds to obtain the benzoxazole compounds of the general Formula I. In the Formulae II and III, the groups $R_1$ and $R_2$ have the meanings given above. Ring closure of the Compounds III can be effected by simple heating or by heating in a high boiling organic solvent in the presence of a catalyst, for example, zinc chloride. It is also possible to directly react 1 mol of naphthalene-1,4-dicarboxylic acid with 2 mols of o-amino-phenols of the Formula II to obtain benzoxazole compounds of the general Formula I, by heating the components in known manner in the presence of acid catalyst, for example, boric acid, in inert organic solvents until completion of the separation of water. The compounds of the general Formula I may also be prepared by heating to 120–200° C. 1 mol of naphthalene-1,4-dicarboxylic acid with 2 mols of the o-amino-phenols of the Formula II in polyphosphoric acid. The benzoxazole ring closure of the compounds of the Formula III succeeds likewise with polyphosphoric acid.

As o-amino-phenols of the Formula II, there may be used, for example, o-amino-phenol, 3-amino-4-hydroxy-1-methyl-benzene, 3 - amino-2-hydroxy-1-methylbenzene, 4-amino-3-hydroxy - 1 - methylbenzene, 5 - amino-4-hydroxy-1,2-dimethyl-benzene, 5-amino - 4 - hydroxy-1,3-dimethylbenzene, 3-amino-4-hydroxy-1-tert. butyl-benzene, 5,6,7,8-tetrahydro-1-amino-2-naphthol, 5,6,7,8 - tetrahydro-3-amino-2-naphthol, 5-amino-6-hydroxy-hydrindene, 3-amino-4-hydroxy-diphenyl, 6-bromo - 4 - amino-3-hydroxy-1-methyl-benzene, 4 - chloro-2-amino-phenol, 5-chloro-2-amino-phenol and 4,6-dichloro-2-amino-phenol.

The new compounds of the general Formula I which are distinguished by an excellent fluorescence and very good fastness to light, are used for the optical brightening of fibrous materials, films, foils, ribbons and other shaped structures of synthetic materials. As synthetic materials, there may be mentioned, for example, polyamides of the polycaprolactam or nylon type, polyacrylonitrile, acetylated cellulose, polymerisation products of the polyethylene and/or polypropylene type, and with special advantage linear polyesters of the polyethylene glycol terephthalate type and polyacetals.

As polyacetals which may be brightened according to the invention, there come into consideration: homo- or copolymers of formaldehyde, homo- or copolymers of trioxane, in particular the copolymers from trioxane and cyclic ethers such as ethylene oxide, propyleneoxide, oxacyclobutanes, glycol formals, diglycol formals, especially those with ethylene oxide.

The novel brighteners may be applied in the course of the production of the materials to be brightened, for example, by adding them to the melts of these materials, for example, melts of polyethylene glycol terephthalate or polyacetal, as those used for the preparation of fibers, foils or shaped structures, or to any other spinning or molding mass of a synthetic material that is capable of being shaped, for example, a polyamide spinning mass. Furthermore, the compounds of the Formula I can be added, prior to or during the polycondensation, for example, to the polyester or to the polyamide, or they can be added prior to or after the polymerisation, to the monomers. It is also possible to thoroughly stir the compounds of the Formula I with powdery polyacetal, for example, by means of a stirrer and to subsequently melt the mixture. Furthermore, it is possible to dissolve the optical brightener in a suitable solvent, for example, a low molecular alcohol such as methanol, ethanol, propanol, or in a ketone such as acetone or cyclopentanone, or in an ether such as dioxane, tetrahydrofurane or glycol dimethyl ether, or in an ester such as acetic acid methyl ester or acetic acid ethyl ester, and to treat the powdery polyacetal with such a solution and, after evaporation of the solvent, to process the brightened polymer as usual into a granulate or to work it on suitable machines directly to the desired shaped structures.

The compounds of the Formula I used in accordance with the present invention are well compatible with polyacetals and are well soluble in a polyacetal melt. Upon cooling, no exudation occurs. Therefore, the compounds of the Formula I are particularly well suited for the brightening of polyacetals.

The compounds of the Formula I can likewise be applied as brighteners to finished structures, such as shaped structures, fibers or textile materials, by treating these materials at an elevated temperature with these new compounds of the Formula I. For this purpose, the structures are treated in known manner with solutions in organic solvents or with aqueous dispersions of the compounds of the Formula I. The solutions or dispersions may be applied to the structures to be brightened in any desired manner, for example, by immersion, spraying or in similar manner. Thereafter, the adhering solvent is evaporated by the action of heat, whereby the compound of the Formula I penetrates into the surface of the structures. It is, however, also possible to contact the structures to be brightened with preferably heated solutions or dispersions of the brightener, until the latter has penetrated into the surface of the structures. If aqueous dispersions of the compounds of the Formula I are used, it is advantageous to add suitable dispersing agents.

For brightening textile materials, the new compounds of the Formula I may also be used together with oxidizing or reducing chemical bleaching agents. It is further possible to use them together with the commercial detergents for the embellishment of the goods to be washed.

The optimum quantities of the compounds of the Formula I used as brighteners vary within wide limits. They depend on the substrate and on the method of applying the brightener. The optimum quantity for each indiviual case can easily be determined by simple preliminary tests. The quantities applied are in general in the range from about 0.005 to 0.2%, preferably 0.01 to 0.1%, referred to the weight of the substrate to be brightened.

The following examples illustrate the versatile possibilities of application of the new compounds, but they are not intended to limit the invention thereto:

Example 1

A bleached fabric from polyethylene glycol terephthalate filaments was treated at a goods to liquor ratio of 1:40, for 90 minutes, at 120° C., in an autoclave, with a dispersion of Compound IV (Table 1), having a strength of 0.2% (referred to the weight of the goods) and prepared with addition of a dispersing agent. After rinsing and drying, the fabric showed, in comparison with a corresponding untreated sample, a brilliant neutral white. A sample brightened at 100° C. showed a distinctly weaker and more greenish white than a sample brightened at 120° C.

The aforesaid Compound IV was prepared in the following manner: 21.6 parts by weight of naphthalene-1,4-dicarboxylic acid were heated for about 2 to 3 hours, at 100–110° C., in 100 parts by volume of chlorobenzene with 35.7 parts by weight of thionyl chloride. About 40 parts by volume of chlorobenzene were separated by distillation at 125° C. under a stream of nitrogen and the parts by volume that had passed over were replaced by fresh chlorobenzene. The acid chloride solution so obtained was allowed to run, at 70 to 75° C., in the course of 15 minutes, into a mixture of 21.8 parts by weight of 2-amino-phenol and 36 parts by weight of dimethylaniline in 200 parts by volume of chlorobenzene, the whole was stirred for 2 hours at the same temperature and allowed to cool, while stirring. The diamide that had separated was isolated, washed consecutively with chlorobenzene and methanol, and dried. 36 parts by weight of diamide melting at 253–257° C. were obtained.

36 parts by weight of the diamide so obtained were heated, for about 2 hours, to about 210° C., under a slight stream of nitrogen, in 150 parts by volume of 1,2,4-trichloro-benzene with 1 part by weight of anhydrous zinc chloride. About 30 parts by volume of trichloro-benzene and water passed over during distillation. The whole was cooled to room temperature, 50 parts by volume were added, the whole was then stirred for about 2 hours and the 1,4-bis-(benzoxazolyl-(2'))-naphthalene that had separated was filtered off with suction. The product was washed with methanol and dried. 25 parts by weight of Compound IV having a melting point of 208–210° C. were obtained. A product recrystallized several times from diethyl ketone, was found to melt at 212–213° C. (yellow needles).

Example 2

1 kg. of polypropylene chips delustered with $TiO_2$ ($\gamma$ red=2.7) was sprayed with a solution of 0.2 g. of Compound V (Table 1) in 100 cc. of methylacetate, dried and mixed. The chips thus treated were then spun into filaments at a temperature of 310° C. on an extruder provided with a spinning head Nozzle _____mm__ 24/0.25
Draw-off _____m./min__ 1000
Titer _____ 50/24

These filaments were hot stretched according to a two stage process. With equal technological properties, they showed a distinct, weakly violet-tinged brightening effect as compared to that of an untreated sample.

The Compound V mentioned in the above Example 2 was prepared from 3-amino-4-oxy-1-methyl-benzene according to the method described in Example 1 for Compound IV.

Example 3

1 kg. of caprolactam, 30 g. of water, 4 g. of $TiO_2$ and 0.8 g. of Compound IX (Table 1) were heated, while stirring, in an autoclave, to 240° C. for 4 hours, under pressure and then for 60 minutes while releasing the pressure. The polyamide melt thus prepared was pressed through a slot die to form a flat sheet and chilled in water, cut and dried. The crude material showed a higher degree of white than a product prepared without such additions. The brightener IX mentioned in the above Example 3 was prepared as follows:

A solution of naphthalene-1,4-dicarboxylic acid-dichloride obtained according to the method indicated in Example 1, was allowed to run, at 70 to 75° C., in the course of 15 minutes, into a mixture of 33 parts by weight of 3-amino-4-hydroxy-1-tert. butyl-benzene and 36 parts by weight of dimethyl aniline in 150 parts by volume of chlorobenzene, and the whole was stirred for 2 hours at 70 to 75° C.; 1000 parts by volume of 2N-hydrochloric acid were then added and the reaction mixture was subjected to a distillation with steam until all chlorobenzene had passed over. After cooling, the diamide that had separated was filtered off with suction, washed with water until neutrality and dried. 48.5 parts by weight of diamide having a melting point of 288–290° C. were obtained.

48.5 parts by weight of the diamide so obtained were heated for 2 hours, to about 210° C., under a weak stream of nitrogen, in 150 parts by volume of 1,2,4-trichlorobenzene with 1 part by weight of anhydrous zinc chloride. 30 parts by volume of 1,2,4-trichloro-benzene and water passed over. The mixture was cooled to about 90° C. and the trichlorobenzene was passed over by distillation with steam. The aqueous phase was decanted from the greasy reaction product that had separated, the latter was dissolved in 150 parts by volume of petrol ether, at the boiling temperature, and filtered while hot. After cooling, 1,4-bis(5'-tert. butyl-benzoxazolyl-(2'))-naphthalene was isolated. 35 parts by weight of the compound in the form of yellow needles melting at 152–154° C. were obtained. The melting point could be raised to 167–168° C. by repeated recrystallization from petrol ether.

TABLE 1

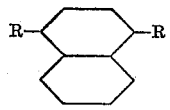

| | Constitution, R= | Melting point, °C. |
|---|---|---|
| IV | (benzoxazolyl) | 212–213 |
| V | CH₃-(benzoxazolyl) | 236–238 |
| VI | CH₃-(benzoxazolyl) | 211–213 |
| VII | CH₃-(benzoxazolyl)-CH₃ | 242–243 |
| VIII | (CH₃)₂-(benzoxazolyl) | 270–272 |
| IX | (CH₃)₃C-(benzoxazolyl) | 167–168 |
| X | Cl-(benzoxazolyl)-CH₃ | 276–278 |
| XI | phenyl-(benzoxazolyl) | 247–248 |
| XII | Cl-(benzoxazolyl) | 253–256 |
| XIII | Cl-(benzoxazolyl) | 238–204 |

The compounds listed in the above Table 1 were prepared according to the methods described in Examples 1 to 3 or according to the following method which was carried out to obtain Compound XI.

10.8 parts by weight of naphthalene-1,4-dicarboxylic acid and 18.5 parts by weight of 3-amino-4-hydroxy-diphenyl were heated for 2 hours, while stirring, to 180° C., with 200 parts by weight of polyphosphoric acid and allowed to stand for 4 hours at this temperature. The reaction mixture was then cooled to 110° C. and poured into 1500 parts by weight of ice-water, stirred over night, filtered off with suction and washed with water until neutral towards Congo paper. The wet product was then stirred for 2 hours with 300 parts by volume of sodium carbonate solution having a strength of 5%, then filtered with suction and washed with water until neutral. The wet crude product was dissolved in 300 parts by volume of dioxane at the boiling temperature, 5 parts by weight of animal charcoal were added, the whole was filtered while hot and the filtrate was diluted with 300 parts by volume of water. The 1,4-bis-(5'-phenylbenzoxazolyl-(2))-naphthalene that had precipitated was isolated and dried. 19 parts by weight of compound XI were obtained in the form of yellow crystals which after repeated recrystallization from toluene were found to melt at 247–248° C.

*Example 4*

1 kg. of polyethylene glycol terephthalate chips (SV=800) delustered with titanium dioxide were sprayed with a solution of 0.5 g. of the compound of the formula

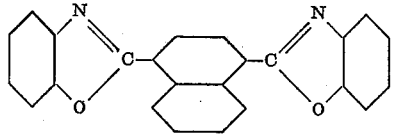

in 100 cc. of methyl acetate, dried and mixed. The chips so treated were then spun to filaments at a spinning temperature of 285° C. on an extruder provided with spinning head Nozzle _____ mm__ 24/0.25
Draw-off _____ m./min__ 1000
Titer _____ 50/24

The filaments thus obtained were stretched at 150° C. by 3.65 times their length. They showed equal technological properties, but also a distinct neutral white which was brighter than that of filaments prepared in the same manner but without treatment with brightener.

*Example 5*

0.02% of a benzoxazole of the formula (XIV)

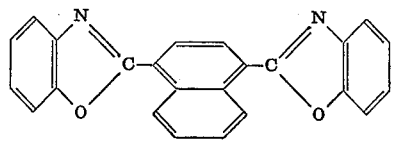

was distributed by means of a rapid mixer in a powdery copolymer consisting of 98% of trioxane and 2% of ethylene oxide, which had been stabilized with 0.5% of 2,2'-methylene-bis-(4-methyl-6-tert. butylphenol), 0.1% of dicyandiamide and 0.03% of melamine. Upon heating to about 200–210° C., the brightener dissolved homogeneously in the polyacetal melt. A color measurement according to DIN 5033 (German Industrial Standards) (measurement of luminescence and remission) carried out on plates molded from this mass showed the following values:

|  | A.[1] |
|---|---|
| With brightener | 65.2 |
| Without brightener | 50.4 |

[1] White reference value.

The brightener covers to a considerable extent the undesired yellow brown discoloration which occurs when the polymer is subjected to further heating. In the above example, the following color values were determined by color measurement after a treatment of the samples for 30 minutes at 230° C.:

|  | A.[1] | Normal color value proportions | |
|---|---|---|---|
|  |  | x | y |
| With brightener | 60.4 | 0.323 | 0.334 |
| Without brightener | 42.8 | 0.330 | 0.341 |

[1] White reference value.

*Example 6*

0.025% of a benzoxazole compound of the formula XIV were distributed by means of a rapid mixer in a formaldehyde homopolymer having acetylene terminal groups, and the mass was further worked up as described in Example 5. The color-determination according to DIN 5033 (German Industrial Standards) gave the following values:

A.[1]
With brightener _____ 61.8
Without brightener _____ 45.2

[1] White reference value.

*Example 7*

A rigid sheet was prepared from suspension vinyl chloride with addition of 3% by weight of titanium dioxide and 0.05% by weight of Compound IV of Table 1 by rolling for 15 minutes at 80° C. The sheet showed a higher degree of white than a sheet prepared in the same manner but without the addition of an optical brightener.

A similarly good effect of the brightener was observed with sheets prepared from emulsion polyvinyl chloride.

*Example 8*

12 parts of dimethyl terephthalate and 5 parts of ethylene glycol were melted at 140–150° C., under an atmosphere of nitrogen, in a vessel of stainless steel provided with stirrer. 0.023 part of manganese acetate and 0.024 part of tin oxalate dissolved in 1 part of ethylene glycol were then added at a temperature of 150° C.

The reaction causing the exchange of ester radicals was then carried out under atmospheric pressure while raising the temperature to 220° C., whereby methanol and, after 2½–3 hours, one part of the glycol distilled off. Thereupon, 0.4% of $TiO_2$, suspended in glycol and, 0.05% of the optical brightener of the Formula IV were added. After stirring for 20 minutes, 0.031 part of triphenyl phosphite was added to the reaction mixture.

The bis-(hydroxyethyl)-terephthalate so obtained was introduced into a polymerisation vessel of stainless steel. The temperature of the melt was slowly raised to 240° C., with cautious stirring, whereupon glycol passed over. When the aforesaid temperature was reached, the pressure in the reaction vessel was gradually released and, at the same time, the temperature of the melt was slowly raised to 275° C. The pressure was then reduced to less than 1 mm. and this pressure was maintained until completion of the reaction. Polycondensation was complete after about 3½–4 hours. The vacuum was released and the space above the polymer melt was filled with nitrogen under pressure. The molten polycondensation product was extruded by the compressed nitrogen, and after chilling in water, granulated and dried.

The product thus obtained was extraordinarily white. The softening point was found to be at 259° C., and the solution viscosity was 820. The filaments prepared from this material were very brightened and showed a blue lustre.

We claim:
1. A compound of the formula

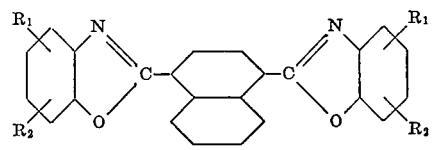

in which $R_1$ and $R_2$ each stand for a member selected from the group consisting of hydrogen, halogen, an alkyl radical having 1 to 4 carbon atoms, phenyl, and $R_1$ and $R_2$ together stand for a bivalent alkylene group having 2 to 5 carbon atoms.

2. The compound of the formula

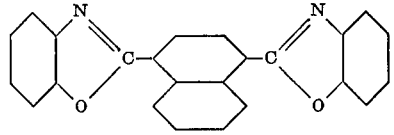

References Cited

UNITED STATES PATENTS

| 2,985,661 | 5/1961 | Hein et al. | 260—307.4 |
| 2,995,564 | 8/1961 | Dunnenberger et al. | 260—307 |
| 3,005,779 | 10/1961 | Ackermann et al. | 252—301.2 |
| 3,135,762 | 6/1964 | Maeder et al. | 260—307 |
| 3,137,655 | 6/1964 | Taul | 252—301.4 |
| 3,250,780 | 5/1966 | Rai et al. | 260—307.4 |

FOREIGN PATENTS 196,343   3/1958   Austria.

OTHER REFERENCES

Nyilas et al., J. Am. Chem. Soc., vol. 82, pages 609–611 (1960).

ALEX MAZEL, *Primary Examiner*.

H. R. JILES, A. D. ROLLINS, *Examiners*.